Nov. 9, 1948.    E. A. STARBUCK    2,453,279
UNIVERSAL JOINT
Filed Aug. 21, 1944    2 Sheets-Sheet 1
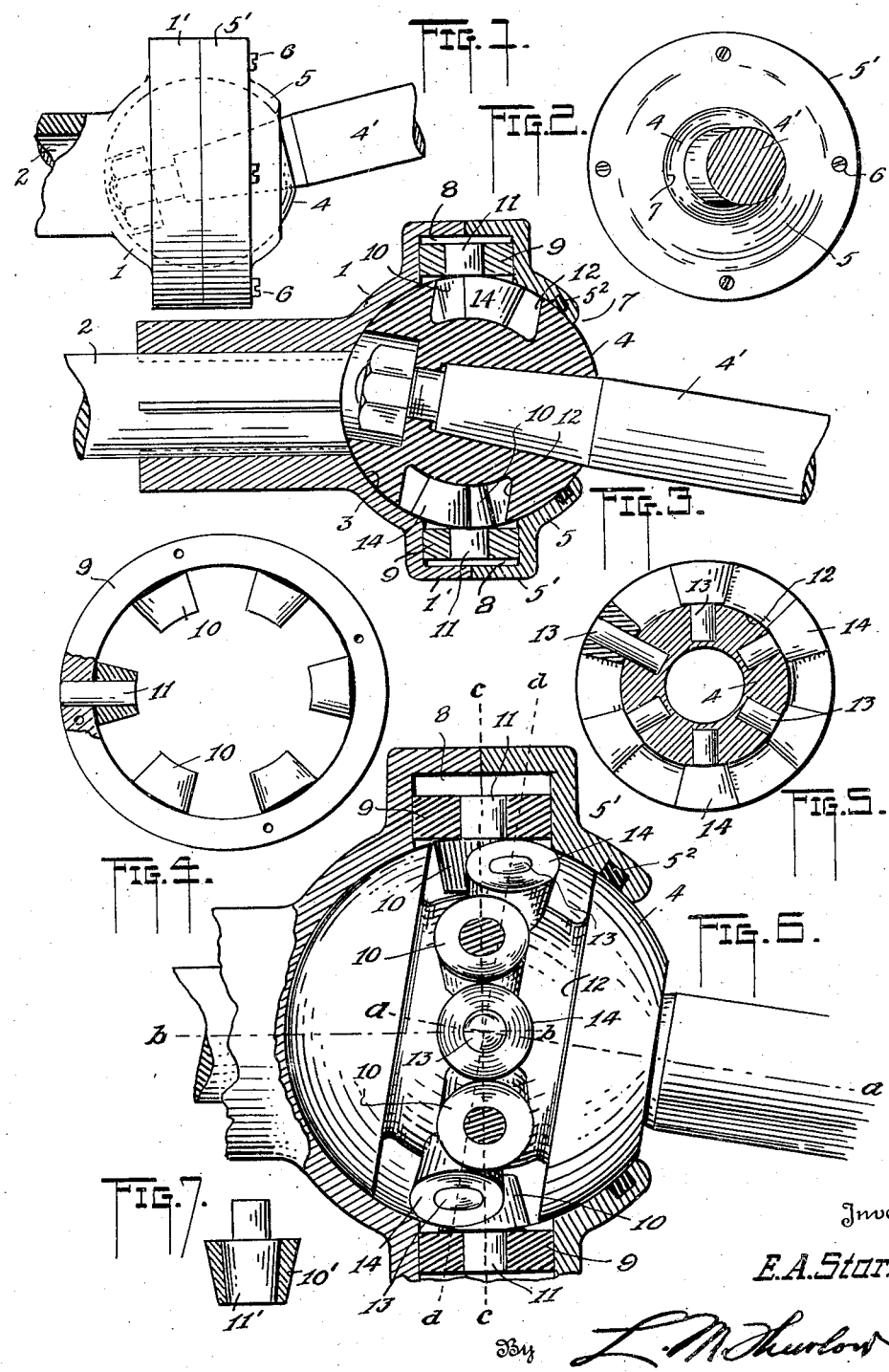
Inventor
E. A. Starbuck
By L. M. Thurlow
Attorney Nov. 9, 1948.   E. A. STARBUCK   2,453,279
UNIVERSAL JOINT
Filed Aug. 21, 1944   2 Sheets-Sheet 2
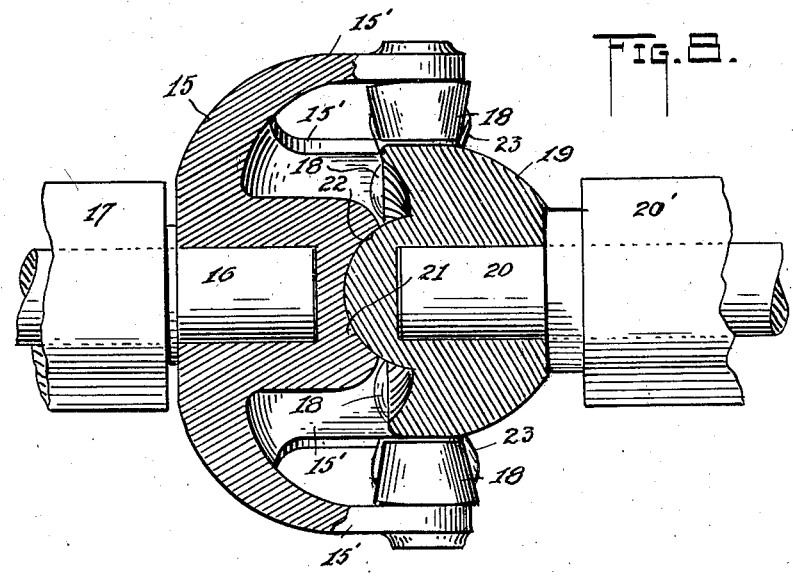
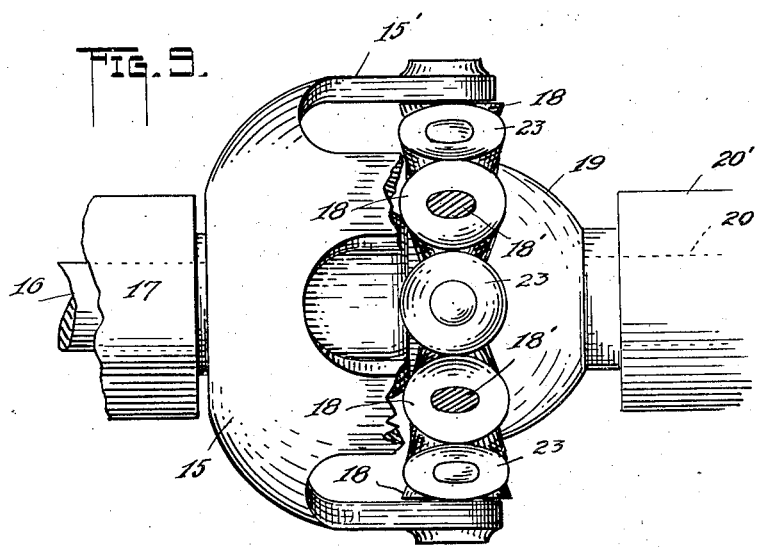
Inventor
E. A. Starbuck
By
Attorney Patented Nov. 9, 1948

2,453,279

UNITED STATES PATENT OFFICE 2,453,279

UNIVERSAL JOINT

Ernest A. Starbuck, Peoria, Ill.

Application August 21, 1944, Serial No. 550,420

7 Claims. (Cl. 74—380)

This invention relates to improvements in so called universal joints such as are employed for transmitting power in machines of various types.

The object of the invention is to provide an arrangement for the named purpose which will permit considerable angularity of the shafts between which the arrangement is interposed, the construction being such that at any degree of shaft angularity there will be no loss of motion at any time.

That the invention may be fully understood the appended drawings are provided forming part hereof.

Figure 1 is a plan of one of two forms of joint of my invention.

Figure 2 is an end elevation of the same.

Figure 3 is a longitudinal section of the same in plan, and in part section.

Figure 4 is a side elevation of a ring shown in Figure 3 including a series of spaced rollers mounted interiorly thereof.

Figure 5 is a side elevation in section of a ball also shown in Figure 3 together with a series of rollers mounted on its outer surface.

Figure 6 is a side elevation of the joint of the preceding figures, much enlarged, parts of the same being shown in longitudinal section.

Figure 7 is an elevation of a stud showing a roller mounted thereon illustrated in section.

Figures 8 and 9 are respectively a longitudinal section, and a plan of a second or modified form of my invention.

Known attempts have been made to provide a device to answer the demands accomplished herein but the structures proposed were such that the intended purpose was defeated and as a matter of fact the devices would operate only when the shaft elements were axially in line or at best when said elements had but a very few degrees of an angularity with respect to each other. The device of this application is so arranged, however, that the shaft angularities may have wide limits with no lost motion in operation, together with smoothness of such operation.

In the drawings the numeral 1 denotes a socket member or shell affixed to a shaft 2 which latter may be, of course, either the driven or driving element. Said member is provided with a spherically curved socket 3 to receive a ball 4 on a shaft 4' and includes a cap portion 5 likewise spherically curved as a second socket portion, the two being clamped together by suitable bolts or screws 6, for example, for retaining said ball, said cap portion terminating in a wide opening 7 to permit wide limits of swing or angularity in respect to the said shaft 4'. Each portion 1 and 5 has an annular extension 1', 5', respectively, creating therein an annular cavity 8 communicating with the ball cavity 3 and receives therein a ring 9 which may be clamped by said portions, together with the other securing means, if desired, to prevent rotation of said ring.

At spaced positions within the ring is a series of extensions taking the form in this instance of tapered rollers 10 each mounted rotatably on a pin or stud 11 suitably retained in the ring, and these studs may be cylindrical as in Figure 4, or they may be but partially cylindrical but terminate each in a tapered portion 11' as in Figure 7, the bore of the roller 10' being tapered to receive such portion 11'.

The ball 4 is furnished with an annular groove 12, see particularly Figure 6, and radiating from the bottom of the groove along a central line thereof is a series of cylindrical studs 13, Figure 5, which, however, may be of the form shown in Figure 7, and already described, each stud receiving a tapered roller 14, said studs constituting extensions companion to those first named.

In a study of Figures 4 and 5 it may be seen that the ball 4, and roller 14 of the latter figure may be placed within the ring of said Figure 4, the rollers of both these members alternating one with another, this likewise being true in Figure 6 wherein since but half the ring 9 is shown the studs 11 of the one half not shown are illustrated in section.

Quite naturally, the rollers of the ring and of the ball have only such dimensions only as to permit the portions of the structure to rotate with respect to each other without interference in any way therefrom.

Figure 6 shows the angularity of one shaft with respect to the other, the broken line a—a representing the axis of one shaft being crossed at the center of rotation of a roller 14, which happens in the present instance to be the center of the ball 4, and by the broken line b—b of the other shaft.

Due to this angularity a line c—c demarking the line of roller center on the ring 9 lies at an angle to a line d—d demarking the line of roller centers on the ball 4, said line d—d, of course, being perpendicular to the axis of the shaft 4' carrying said ball. Both lines c—c and d—d, of course, pass through and cross at the place of crossing of the lines a—a, b—b, the center of said roller 14.

The somewhat staggered appearance of the rollers in Figure 6 is due, of course, to the two different planes of rotation. In this figure, in plan, at least the three central rollers are in driving contact and this would also be true of the three rollers diametrically opposite them, but not visible. The driving contact of these positions is naturally continuous in the precession of the rollers whatever the shaft angularity may be, or whether the center of a roller 14 or a roller 10 may be at the place of crossing of all of the above named lines. Naturally, also, the rollers on a line 90° removed from a line passing through the center of rotation of the device at said place of crossing will separate from each other at both sides of said device as observed with respect to the roller 10 at the upper and lower extremes of the figure named.

Whatever the angularity of the shafts may be, it is seen, a positive driving must result, the rate of rotation of the shafts, therefore, being individually uniform.

It is observed that the groove 12 in the ball 14 may be of sufficient width to provide for great latitude of swing of the shaft 4' without interference of the walls of the groove with the rollers 10 on the ring 9.

Conveniently, the device may retain an ample supply of a lubricant, if desired, a ring of packing material 5² being illustrated as a retainer for such lubricant.

Figures 8 and 9 show a modified form of the universal joint which in all ways serves the same end as that joint described.

In those figures 15 is a member for attachment to a shaft 16 mounted in a bearing 17, for example, arranged to prevent endwise movement of said shaft. This member 15 takes the place of the previously described socket member 1 by having a series of fingers 15' at spaced intervals arranged in a circle but not so illustrated. Each is provided with a tapered roller 18 as the equivalent of the described roller 10.

Facing the member 15 is a member 19 affixed to a shaft 20 carried in a bearing 20', either this bearing or the bearing 17 being swingable to obtain angularity, and also assisting in holding the parts in operative relation. Said member 19 has an extended spherically curved surface 21 axially thereof adapted to seat and to work in a socket 22 complementary thereto in said member 15.

The member 19, as with the ball 4 described, is provided with a series of spaced tapered rollers 23 which lie between the rollers 18, the rollers alternating in the order as described with respect to the first form of device herein.

In Figure 9 these rollers, as it happens, are shown in line with each other, the shaft axes, of course, being in alignment. In this case, as in the other, the center of the central roller 23 is the point about which one half of the device swings with respect to the other.

The main difference between the two forms in the point of use is that there is no retainer, such as the previously described portion 5, to hold the two halves of the device in working position. For this reason the bearings 17 and 20 are provided, or one of them at least, where the other may be otherwise held, to maintain driving relation by holding in mesh the two series of rollers. Otherwise this form is a simple one and one that answers the demand.

The term "extensions" has been applied to the studs and their rollers or the equivalents thereof since, naturally, a series of studs or pins only would, perhaps, serve the purpose although the rollers are preferable as reducing friction. In some of the claims the terms "extensions" will be used.

In any event whatever is employed on and between the ring 9 and the ball 4 on the one hand, or on the fingers 15' and member 19, on the other, all must be directed toward the axial line of the parts carrying them.

While the ring 9 provides means on which to assemble the studs 11 conveniently, the latter may perhaps be carried by and extend from a wall of the socket member 8, 5 itself, this being mere choice.

While I have described the structure in detail slight changes therein may be made while still serving the desired purpose while lying within the meaning of the claims to follow.

I claim:

1. A device of the nature described including in its construction a driving shaft and a driven shaft whose axes may lie in alignment or lie at an angle to each other, a ball fixed with respect to an end of one of the shafts and having a groove therein lying in a plane perpendicular to the axis of the shaft carrying said ball, the bottom wall of the groove lying substantially on a circle described from said shaft axis, a series of tapered rollers mounted in said groove in spaced order on said bottom wall and encircling said ball in said groove and radiating therefrom, the axes of the rollers lying in a plane perpendicular to said shaft axis, a socket member fixed with respect to the other shaft adapted to receive said ball, a series of spaced tapered rollers carried in and extending from said socket member and lying between the rollers of said ball, all of said rollers of said socket member lying in a plane perpendicular to the axis of the shaft carrying that member, the said planes cutting the axes of the shafts at the position where the said axes meet, the rollers of the ball and of the socket member all being uniform in size and form, the rollers of one of such members adapted to engage between the rollers of the other member in abutting driving relation.

2. A device of the nature described including in its construction a driving shaft and a driven shaft whose axes may lie in alignment or lie at an angle to each other in a single plane and cutting each other, a ball affixed to one of the shafts and having a groove therein lying in a plane perpendicular to the axis of the shaft carrying said ball, the bottom wall of the groove lying substantially on a circle described from said shaft axis, a series of tapered rollers mounted in said groove in spaced order on said bottom wall and encircling said ball in said groove and radiating therefrom, the axes of the rollers lying on a plane perpendicular to said shaft axis, a socket member of two portions fixed with respect to the other shaft adapted to receive and retain the ball, a ring held between the said portions spaced from the ball and encircling the same, a series of spaced tapered rollers extending from the surface of the ring facing the ball, said series of rollers lying in a plane perpendicular to the shaft carrying said socket member the two named planes cutting the axes of the shafts where the shaft axes meet, all of the rollers of both series being uniform in size and form, and those of each series being separated from each other by spaces equal to the largest diameter of any roller, the two series of rollers adapted to have abutting driving relation.

3. A device of the nature described including in its construction a driving shaft and a driven shaft whose axes may be in alignment or lie at different angles to each other, a member fixed with respect to each shaft to rotate therewith, one lying within the other, means for maintaining centered relation with each other, a series of spaced conical extensions projecting at their smallest diameters from and carried by each member, all of the extensions of both series being uniform in size and of identical structure, the two series of extensions meshing with each other in closely working abutting engagement.

4. A device of the nature described including in its construction a driving shaft and a driven shaft whose axes may be in alignment or lie at different angles to each other, a member fixed with respect to each shaft to rotate therewith, one lying within the other with an annular space therebetween and means for maintaining centered relation with each other, and a series of rounded and tapered spaced extensions projecting from and carried by each member and all lying in said annular space, each extension of one member adapted to lie within the spaces between two extensions of the other member in meshed abutting driving relation.

5. A device of the nature described including in its construction a driving shaft and a driven shaft whose axes may be in alignment or at different angles to each other, a member fixed with respect to each shaft to rotate therewith, one lying within the other arranged to maintain centered relation with each other, a series of spaced studs extending from and carried by each member in radial positions and all lying within said annular space, a roller mounted to rotate on each stud, the rollers of each series of studs being tapered toward the axis of rotation of the member carrying them, all being uniform in size and of identical structure, a roller of one member adapted to lie within the space between two rollers of the other member in meshed abutting relation.

6. A device of the nature described including in its construction a cavitied member of two connected parts mounted to rotate a ring secured to said parts, a series of spaced extensions carried by and projecting from said ring into the cavity thereof toward the axis of rotation, and all lying in a plane erected perpendicularly to said axis of rotation, a second mounted rotatable member lying within the first said member, and a series of spaced radially arranged extensions carried by said second member, all lying in a plane perpendicular to the axis of rotation of that member, the axes of the named members coinciding with a point central of both the latter, the planes of rotation of both series of extensions cutting said point, one of said members adapted to swing relative to the other about said point, the extensions of both members being tapered toward that point and all of them having uniform size and form, the extensions of one member alternating in positions with those of the other member in one of the positions of the members relatively, and having abutting driving relation with said extensions of said other member 7. A device of the nature described including in its construcion a rotatable driving member and a rotatable driven member mounted one in the other adapted to swing relative to each other about a common point through which the axes of the two members cut each other, and a series of extensions carried by and radiating from the center of rotation of each member, the extensions of each member being conical in form, its large end being most distant from said common point, and all being identical in size, and each series being evenly spaced apart around the member carrying the same, the two series meshing in abutting driving relation with each other when the axes of the members are in alignment, and certain of the extensions of the two series meshing in driving relation at diametrically opposite positions at the members when the latter are disposed at an angle to each other.

ERNEST A. STARBUCK.

REFERENCES CITED

The following references are of record in the file of this patent:

UNITED STATES PATENTS

| Number | Name | Date |
| --- | --- | --- |
| 563,971 | Kohlmeyer | July 14, 1896 |
| 1,376,437 | Hood | May 31, 1921 |

FOREIGN PATENTS

| Number | Country | Date |
| --- | --- | --- |
| 201,873 | Great Britain | 1923 |
| 388,172 | Great Britain | 1933 |